United States Patent [19]
Eagen

[11] Patent Number: 5,837,912
[45] Date of Patent: Nov. 17, 1998

[54] APPARATUS AND METHOD FOR RECORDING MUSIC FROM A GUITAR HAVING A DIGITAL RECORDED AND PLAYBACK UNIT LOCATED WITHIN THE GUITAR

[76] Inventor: Chris S. Eagen, 670 Eldorado Ln., Las Vegas, Nev. 89123

[21] Appl. No.: 901,714

[22] Filed: Jul. 28, 1997

[51] Int. Cl.⁶ .............................. G10D 1/08; G10D 3/00; G10H 1/32
[52] U.S. Cl. .................................. 84/267; 84/291; 84/743
[58] Field of Search ............................ 84/609–614, 646, 84/723–746, DIG. 30, 267, 291, 292

[56] References Cited

U.S. PATENT DOCUMENTS

| | | | |
|---|---|---|---|
| 4,080,867 | 3/1978 | Ratanangus | 84/267 X |
| 4,711,149 | 12/1987 | Starr | 84/743 X |
| 5,442,986 | 8/1995 | Cota | 84/267 |

*Primary Examiner*—Stanley J. Witkowski
*Attorney, Agent, or Firm*—Harry M. Weiss; Jeffrey D. Moy; Harry M. Weiss & Associates, P.C

[57] ABSTRACT

An apparatus and method is disclosed for recording musical sounds generated by a guitar type musical instrument. A mini-disc recorder unit located in and forming a portion of the envelope or housing of the guitar converts the analog output from the guitar into a digital recording for playback use by the musician and/or for generating musical sounds to a listener.

20 Claims, 5 Drawing Sheets

APPARATUS AND METHOD FOR RECORDING MUSIC FROM A GUITAR HAVING A DIGITAL RECORDED AND PLAYBACK UNIT LOCATED WITHIN THE GUITAR

FIELD OF THE INVENTION

This invention relates generally to apparatus and methods for recording musical sounds from a musical instrument and, more particularly, to an apparatus and method for recording long lasting, high quality, noise-free musical sounds from a single hand-held, portable guitar.

BACKGROUND OF THE PRIOR ART

In the past, recordings of music generated by musical instruments were created on various recording mediums such as musical records, cassette type or other forms of magnetic recording mediums. The recordings of such music were usually created for public listening and a great deal of care was taken to create a "master" recording with the highest quality of musical sound that was possible so that many multiple recordings could be generated from the "master" recording for dissemination to the public.

While most of these recordings were previously for public listening, the musicians playing various musical instruments were very desirous of achieving recording of musical sounds that they generated so that they could capture the "magic moment" when they created a particular combination of musical sounds that might lead to or become an important musical piece.

Thus, musical recordings for public use and listening pleasure is on a macroscopic level relative to creating musical recordings of a single musical instrument for the musician playing the musical instrument which is on a microscopic level.

In either situation, whether it was the public listening to the musical recordings or the musician listening to the musical sounds created by the musician from a single musical instrument, it was extremely important to create higher quality, noise-free musical sounds. Conventional tape recordings of these musical sounds were not able to eliminate undesired distortions that were created by noise in the vicinity of the tape recording operation.

Very expensive sound recording studios were used to try to eliminate noise that reduced the quality of the musical sounds that were to be recorded. However, as a practical matter, musicians desiring to play their musical instruments could not race over to a sound recording studio every time they were playing their musical instruments to try to record high quality musical sounds from their musical instruments. Furthermore, as is well known, inspiration may come and go in a fleeting few moments, therefore, it is imperative that musicians be able to obtain instant high quality, noise-free recordings of their creative musical renditions. This is especially applicable for musicians playing music on their hand-held, portable musical instruments such as guitars or other types of string type instruments.

U.S. Pat. No. 3,562,397 utilized a tape recorder in a certain type of console electronic musical instrument to try to record higher quality musical sound. However, this disclosed arrangement was for a large electronic console type musical instrument and was not practical for use with hand-held, portable musical instruments such as guitar or other types of string type instruments.

U.S. Pat. No. 3,746,772 is similar to U.S. Pat. No. 3,562,397 and directed to a keyboard type electronic musical instrument with a built-in tape recorder to try to record high quality musical sound. However, the problem with both U.S. Pat. Nos. 3,746,772 and 3,562,397 is that the tape recorder records the musical sounds on a magnetic tape medium which is not very good for maintaining long lasting sound quality. Furthermore, these two prior art console type music recording systems use analog recording techniques rather than the much better, higher quality, longer lasting attributes of a digital recording system. Additionally, the tape recorders of these two prior U.S. Patents do not readily permit implementation in hand held, portable musical instruments such as guitars.

Consequently, a need existed for an apparatus and method for instantaneously recording long lasting, high quality, noise-free musical sounds from a hand-held, portable guitar in a digital rather than an analog format.

SUMMARY OF THE INVENTION

Accordingly, it is an object of this invention to provide an improved apparatus and method for recording long lasting, high quality, noise-free musical sounds from a hand-held, portable musical instrument.

It is a further object of this invention to provide an improved apparatus and method for recording long lasting, high quality, noise-free musical sounds in a digital format from a hand-held, portable musical instrument such as for electric, acoustic and classical guitars.

It is a still further object of this invention to provide an improved apparatus and method for recording long lasting, high quality, noise-free musical sounds in a digital format from a hand-held, portable musical instrument such as for electric, acoustic and classical guitars wherein recording in the digital format is achieved by incorporating a digital recording unit within a portion of the housing of the electric, acoustic and/or classical guitar.

BRIEF DESCRIPTION OF THE PREFERRED EMBODIMENTS

In accordance with one embodiment of this invention, an apparatus is disclosed for recording long lasting, high quality, noise-free musical sounds generated by a hand-held portable musical instrument selected from a class of guitars including electric, acoustic and classical guitars which comprises a guitar selected from a class of guitars including electric, acoustic and classical guitars and having means for generating analog type musical sounds that are created by a user of the guitar; and means located on the guitar and electronically connected to the means for generating analog type musical sounds for converting the analog type musical sounds to digital type musical sounds to produce long lasting, high quality, noise-free recorded musical sounds. The means located on the guitar is a mini-disc unit having at least record and playback capabilities. The guitar has an exterior housing, and the mini-disc unit is located within a portion of the exterior housing and forms part of the exterior housing of the guitar.

In accordance with another embodiment of this invention, a method is disclosed for recording long lasting, high quality, noise-free musical sounds generated by a hand-held, portable musical instrument selected from a class of guitars including electric, acoustic and classical guitars which comprises the steps of: providing a guitar selected from a class of guitars including electric, acoustic and classical guitars and having means for generating analog type musical sounds that are created by a user of the guitar; and incorporating means located on the guitar and electronically connected to the means for generating analog type musical sounds for converting the analog type musical sounds to digital type musical sounds to produce long lasting, high quality, noise-free recorded musical sounds. The means located on the guitar is a mini-disc unit having at least record and playback capabilities. The guitar has an exterior housing, and the mini-disc unit is located within a portion of the exterior housing and forms part of the exterior housing of the guitar.

The foregoing and other objects, features and advantages of this invention will be apparent from the following more particular description of the preferred embodiments of the invention as illustrated in the accompanying drawings.

DESCRIPTION OF THE SPECIFICATION

Figure 1:
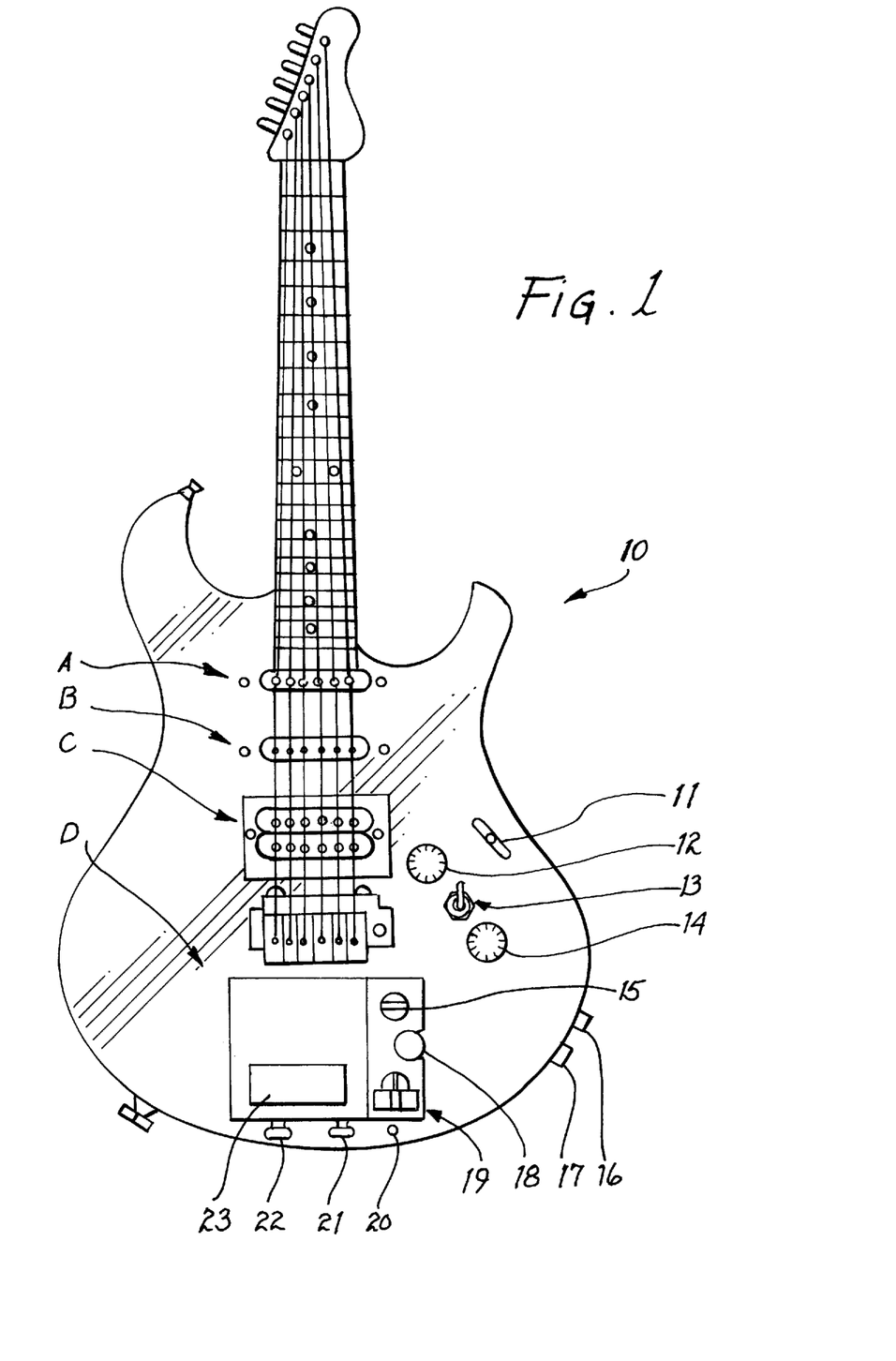
FIG. 1 is a side elevational view of a guitar in accordance with this invention illustrating the incorporation in a portion of the exterior housing thereof a mini-disc means sound recording unit.

Referring to FIG. 1, reference number 10 generally designates a guitar in accordance with this invention. The guitar 10 of this invention is preferably either an electric type guitar or an acoustic guitar or a classical type guitar, however, the embodiment shown in the Figures of this application is directed to an electric guitar. Electric type guitars utilize metal type strings and preferably six such strings are used as shown in FIG. 1. Similarly, acoustic type guitars also use preferably six metal type strings. On the other hand, classical guitars do not use metal type strings but use (six) strings whose vibration by the user or musician playing the guitar 10 cause a piezoelectric quartz crystal assembly to pick up and sense the various string vibrations and generate electronic signals representative of the associated vibrations of the (six) strings. The metal strings of the electric and acoustic guitars and the non-metal strings of the classical guitar generate electric signals as will be described below when these strings are vibrated by the musician.

A pickup selector 11 (in, for example, a five way selector switch) selects which one of five combination pick ups is to be selected. Either one of pick up assemblies A, B or C as shown in FIG. 1 or two pick up combinations A+B or B+C. Reference number 12 controls the volume of sound generated by pick ups A, B and C. Reference number 13 is a switch that selects either one mode where the musical sounds of the guitar 10 are outputted to, for example, amplifiers (not shown) or another mode where the musical sounds of the guitar 10 are directed to an input port of a mini-disc unit D. Reference number 14 designates tone controls for the guitar pick ups A, B and C. Reference number 15 is a volume control element for the mini-disc unit D. Reference numeral 16 is a port in the guitar 10 that is, for example, used to provide an analog output to an amplifier (not shown). The port 16 is also used to provide an output port for the mini-disc unit D to generate musical sounds outside the guitar 10 stored in the mini-disc of the mini-disc unit D. Reference numeral 17 is a port that provides a digital output from the mini-disc recorder unit D to, for example, another digital recorder unit such as another mini-disc unit (not shown) or some other type of digital recorder unit. Reference numeral 18 is a dial control element that is preferably used for labeling and editing functions of the mini-disc that is located within the mini-disc recorder unit D. Reference number 19 generally designates buttons on the mini-disc unit for, for example, stop-play-track select-forward or back movements. Reference numeral 20 designates an input jack port for providing a source of D.C. input of, for example, 4.5 volts to charge a battery, not shown, in the mini-disc unit D to permit its operation in a stand alone environment away from any 110 Volt A.C. energy source. Alternatively, the input jack port 20 can be used to provide a direct source of electrical energy from a 110 Volt A.C. energy source that uses an A.C. to D.C. intermediate transformer type unit to convert an 110 Volt A.C. input to a desired D.C. voltage level to operate the mini-disc unit D. For the purposes of using the mini-disc unit D to digitally record musical sounds from the guitar 10, record button 21 is used. Reference number 22 designates the mini-disc eject button to eject a mini-disc (not shown) that is in the mini-disc unit D. Reference number 23 designates an L.C.D. (liquid crystal display) window that provides various items of information to the user of the guitar 10 such as the track number that is being used, the name of the mini-disc that is being used in the mini-disc unit D, the name of the track that has been selected and is being used, the time period of the mini-disc recording or the time left or to be used in the mini-disc recording or the time that was used in the mini-disc recording, etc. The remaining parts of the guitar 10 are conventionally used in various guitars.

Figure 2:
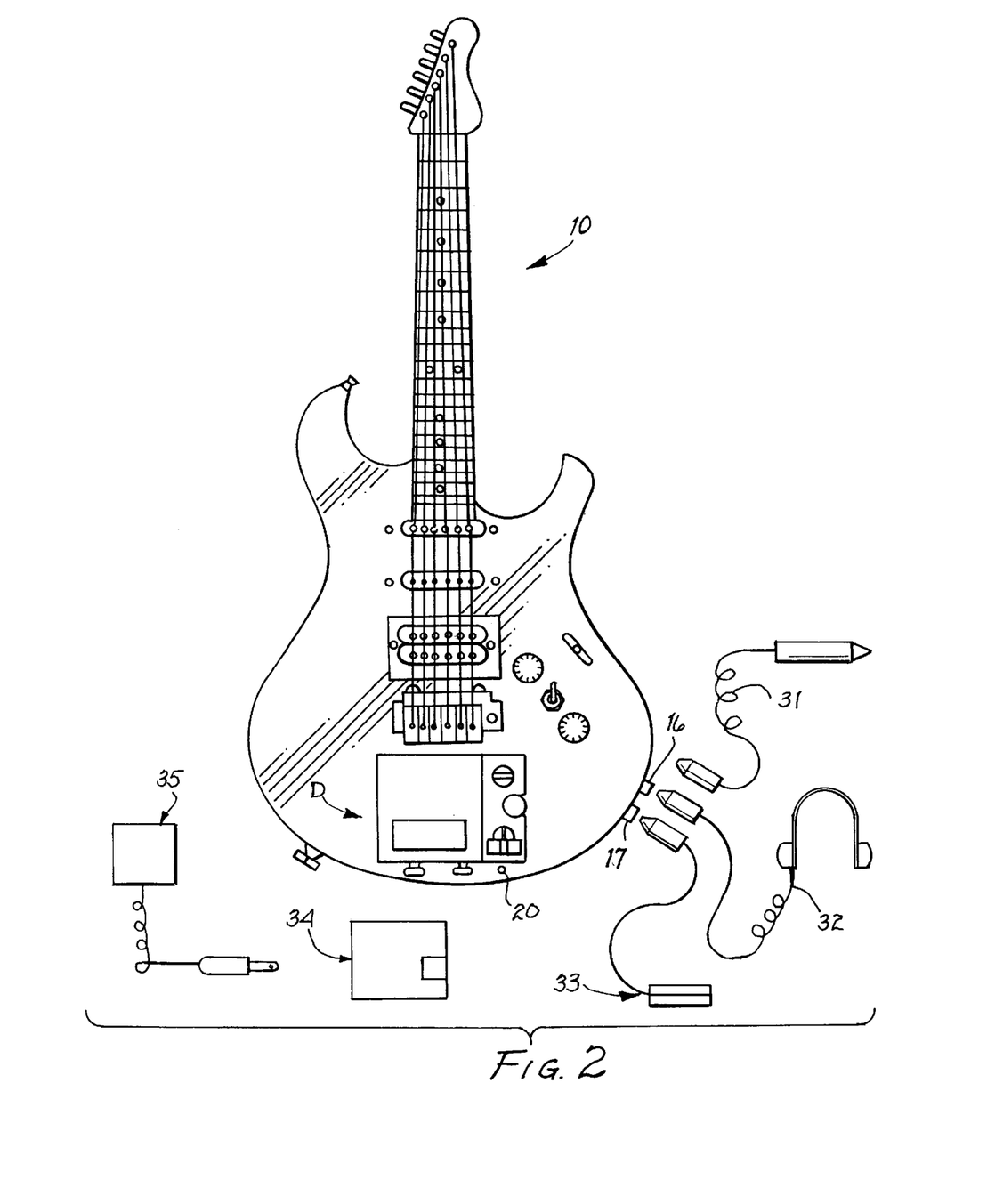
FIG. 2 is a side elevational view of a guitar in accordance with this invention similar to FIG. 1, but also illustrating components that are useable with the guitar depicted in FIG. 1.

Referring to FIG. 2 which depicts the guitar 10 of FIG. 1, a number of elements are shown which are used with the guitar 10. For example, reference number 31 depicts an analog output cable 31 which has a first jack type member for insertion, if desired, into the (adjacent) port 16 of the guitar 10. Attached to the other end of the cable 31 is a jack that can be used, if desired, as an input jack to provide the analog output from the guitar 10 to, for example, an amplifier or speaker (not shown). If desired, the analog output from the guitar 10 can be listened to by means of the headphones 32 which are connected to the port 16, if desired. A digital output cable unit 33 is shown for coupling the digital output from the mini-disc unit D by means of inserting a jack (located adjacent to the port 17) into the port 17 and connecting the external jack at the other end of the digital output cable unit 33 to any desired external digital recorder. Reference number 34 designates a mini-disc that is used in the mini-disc unit D. Reference number 35 designates a power pack unit or transformer type device that is plugable into a 110 Volt A.C. energy source by means of plugs (not shown) and this power pack 35 provides a D.C. voltage source of preferably 4.5 volts to the input jack port 20 of the guitar 10. For example, the digital output cable unit 33 can be a SONY-POC-151 HG or POC 152 HG unit and the mini-disc unit can be a SONY Portable Mini-Disc Recorder sold under the product name MZ-R3. Other equivalent products can be used, if desired.

Figure 3:
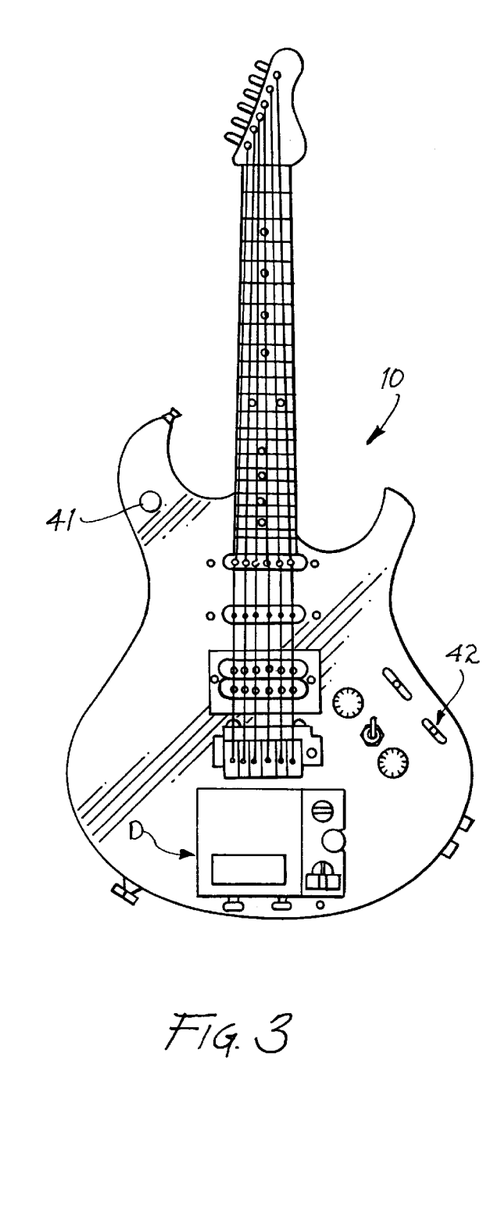
FIG. 3 is a side elevational view of a guitar in accordance with this invention similar to FIG. 1 showing additional features of the guitar.

Referring to FIG. 3 which illustrates the guitar 10 of FIGS. 1 and 2, reference number 41 designates a new feature of the guitar 10 which is, in effect, a port for permitting, for example, a microphone input jack from a microphone (not shown) to be inserted into the port 41 to permit voices or other sounds to be inserted into the inner portion of the guitar 10 for merging with musical sounds generated by a musician or user playing the guitar 10. These merged sounds can be digitally recorded by the mini-disc unit D. Reference number 42 is a D.S.P. (Digital Sound Processing) selector switch to permit selection of any of the following (Reverb-Echo-Flange-Chorus-Distortion) which can be used in digital recording for the mini-disc unit D.

Figure 4:
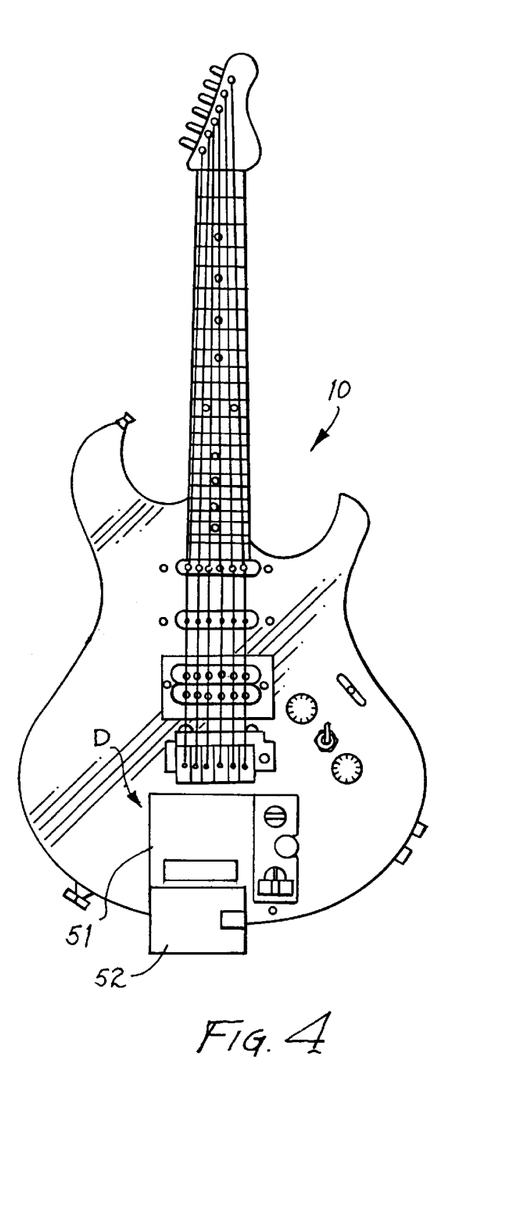
FIG. 4 is a side elevational view of the guitar of this invention, as shown in FIG. 1, showing a mini-disc recording element outside the mini-disc sound recording unit prior to insertion therein or after removal thereof.

Referring to FIG. 4, this Figure corresponds to FIG. 1 and provides a further clarification thereof. Reference number 51 designates a door for the mini-disc unit D which serves to permit entry therein and removal therefrom of a mini-disc 52. Thus, individual mini-discs 34 of FIG. 2 can be inserted into and, after recording thereon, removed from the mini-disc unit D using the door 51 thereof.

Figure 5:
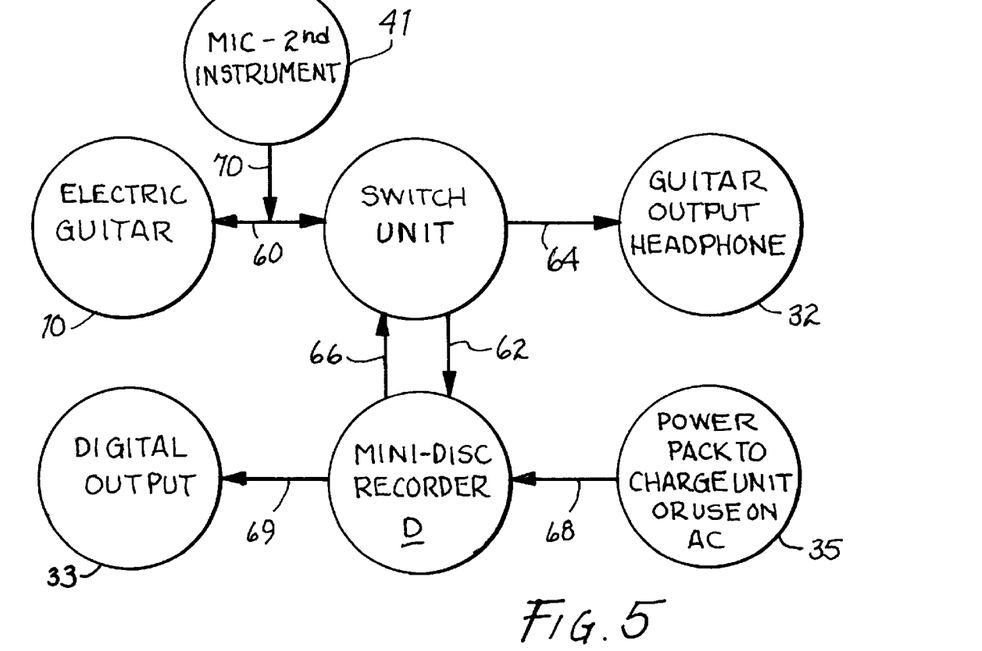
FIG. 5 is a simplistic diagram of how the mini-disc recorder is electronically coupled to the guitar of the FIG. 1 embodiment.

Referring to FIG. 5, the flow type diagram of this Figure illustrates the interconnection of the various elements or components of the guitar apparatus 10 that is depicted in FIGS. 1 and 2. The electric guitar 10 is electrically coupled to the mini-disc unit D through the switch 13 or switch unit 13 which, as was described above with reference to FIG. 1, serves to switch analog output 60 of the guitar 10 to provide an analog input 62 to the mini-disc unit D. The switch or switch unit 13 can selectively switch the analog output 60 from the guitar 10 to provide an input 64 to the guitar output headphones or headphones 32 (see also FIG. 2), if desired, so that the user or musician can instantaneously listen to the analog musical input 60 from the guitar 10. The mini-disc unit D can provide, if desired, an output 66 of the music contained therein to the guitar output headphones 32 after proper selection for this mode of operation by the switch or switch unit 13 which receives the output 66 from the mini-disc unit or recorder D and sends it on to the guitar output headphone or headphones 32 by means of the input 64 thereto. The (battery or transformer) power pack 35 that is used to charge the mini-disc unit or recorder D provides the D.C. voltage source thereto (by means of conduit 68) as described with reference to FIG. 2. As was also described with reference to FIG. 2, the digital output 33 from the mini-disc unit D is provided by means of output conduit 69. With reference to both FIGS. 3 and 5, a microphone or, if desired, another musical instrument 41 can provide an analog input to the guitar 10 by means of its analog output line 70 to the bidirectional line 60 going to the guitar 10. This permits blending of the sounds from the microphone or second instrument 41 into the guitar 10 which provides a total analog output 60 to the switch 13.

Figure 6:
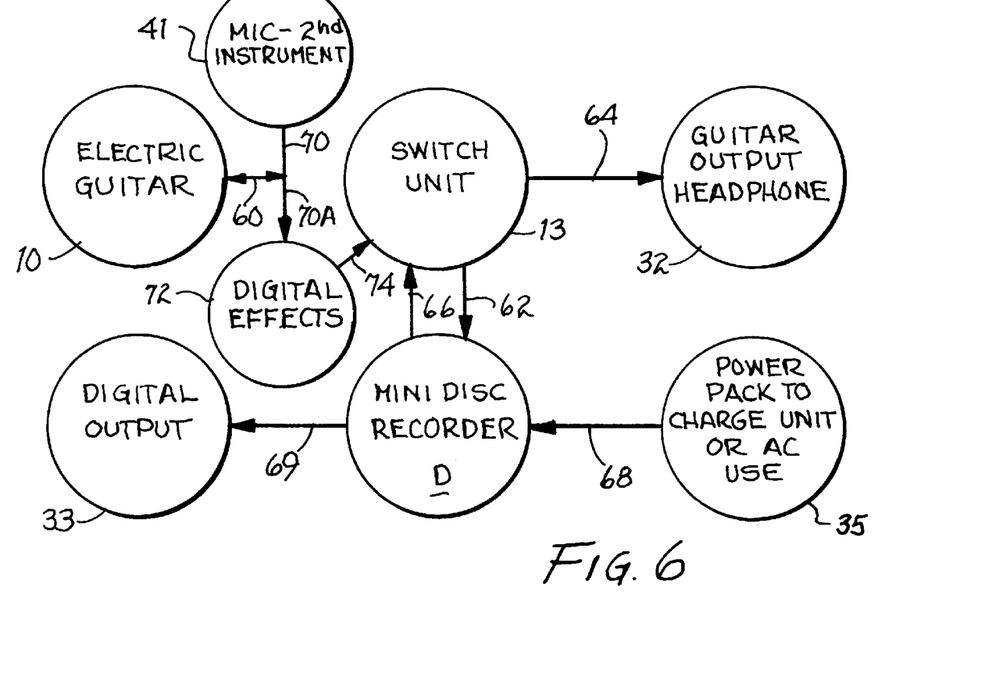
FIG. 6 is a simplistic diagram of another arrangement for electronically coupling the mini-disc recorder to the guitar of FIG. 1.

Referring to FIG. 6, this flow diagram type Figure is similar to the flow diagram of FIG. 5. Therefore, the description of FIG. 5 (as well as the description of associated FIGS. 1, 2 and 3) are incorporated into the description of this FIG. 6. Accordingly, the same reference numbers are used with reference to FIG. 5 are used in this FIG. 6. In the embodiment of FIG. 6, digital effects 72 are provided as an input 74 to the switch or switch unit 13 after receiving the analog output 60 from the guitar 10 by means of conduit 70A which may also contain voice from a microphone or music from another (second) musical instrument if such is imputed to the guitar 10 from the analog output line 70 connected to the microphone or second instrument 41. Thus, the combined input 74 to the switch or switch unit 13 from the guitar 10, the microphone or second instrument 41 and digital effects 72 permits the switch 13 to provide, as described above, the input 64 to the headphone or headphones 32 and/or to the input 62 to the mini-disc unit or recorder D.

Figure 7:
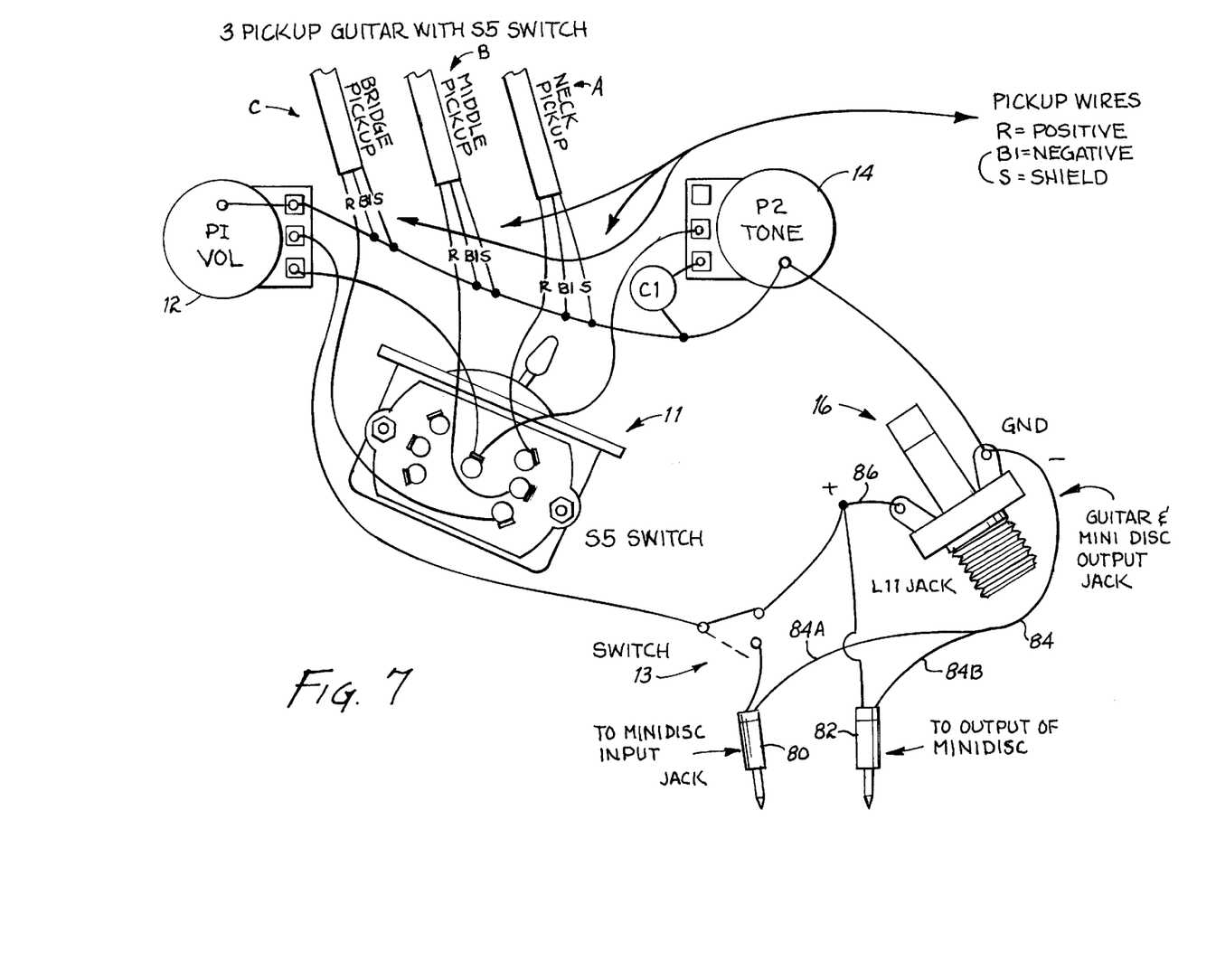
FIG. 7 is a diagram depicting how the mini-disc recorder is electrically connected to the guitar below the exterior housing of the guitar.

Referring to FIG. 7 in combination with the other Figures of this patent application including specifically FIGS. 1 and 2, electrical connections are shown beneath the outer surface of the guitar 10 as depicted in FIGS. 1 and 2. As discussed above, the guitar 10 shown in FIGS. 1 and 2 is a 3 pickup guitar having a neck pickup A (located near the neck of the guitar 10 in FIG. 1), a middle pickup B located below the neck pickup A, and a bridge pickup C located below the middle pickup B. Three pickup wires are provided to each of the three (A, B, C) pickups of the guitar 10. The three pickups A, B, and C function similar to the three pickups of an electric guitar wherein the use of permanent magnets in association with an electrical coil (for the electric guitars) serves to create different changes in the magnetic flux because of the associated moving conductive (metal) wires of the electric guitar. For classical guitars where non-metal wires are used, piezoelectric quartz crystal devices are used to sense the different vibrations of the non-magnetic wires of the classical guitar and to generate electrical signals corresponding to these vibrating non-metal wires. A positive electrical signal is generated by the vibrating wires of the guitar 10 on the line R for the neck pickup A, the middle pickup B and/or the bridge pickup C. A negative signal is generated by the vibrating wires of the guitar 10 on the line B1 of the neck pickup A, the middle pickup B and/or the bridge pickup C. In the use of a shield type wire covering, a negative signal is produced on the line S for the neck pickup A, the middle pickup B and/or on the bridge pickup C. The volume control 12 (see FIG. 1) is shown in FIG. 7 as having an electrical contact with both the negative B1 and shield S lines from the neck pickup A, the middle pickup B and the Bridge pickup C. The volume control 12 as shown in FIG. 7 has two other terminals, one (the other end one) is electrically connected to the S5 Switch 11 shown in FIG. 7. The volume control 14 has one (outside) terminal thereof connected to wires B1 and S of each of the pickups A, B, and C through a capacitator C1. The center terminal of the tone control 14 is connected to a center terminal of the S5 Switch 11. The center terminal of the volume control 12 is connected to the switch 13 which is shown as a biplole switch connectable to either a jack 80 (that is located beneath the mini-disc unit D of FIG. 1 and connected to an input port (not shown) beneath the mini-disc unit D) or to a jack 82 (that is also located beneath the mini-disc unit D of FIG. 1) and connected to an output port (not shown) beneath the mini-disc unit D). A ground (or negative) connection is made by wire 84 from the guitar output 16 (that is shown in FIG. 7 as a guitar and mini-disc jack, however, a port for the external electrical connection is located within the threaded portion of the jack—with the threaded portion used to secure this jack to the envelope of the guitar 10) to each of the jacks 80 and 82 by means of wires 84A and 84B electrically connected to the wire 84. The positive terminal of the guitar and mini-disc output jack is connected to the other wires 86A and 86B respectively connected to the input jack 82 by means of wire 86 (which is directly connected to the jack 82). The positive terminal of the guitar and mini-disc output jack is connected (by means of the selection switch 13 in the position shown in FIG. 7 to the (middle terminal) of the volume control 12. The positive signal generated by the pickups A, B, or C is conducted using the respective R wires of each of these pickups to (three) different terminals of S5 Switch 11.

While the invention has been particularly shown and described with reference to the preferred embodiments thereof, it will be understood by those skilled in the art that the foregoing and other changes in form and details may be made therein without departing from the spirit and scope of the invention. For example, implementation of the mini-disc unit D into the housing or envelope of an acoustic or classical guitar can be performed in accordance with the teachings of this invention.

What is claimed is:

1. An apparatus for recording long lasting, high quality, noise-free musical sounds generated by a hand-held, portable musical instrument selected from a class of guitars including electric, acoustic and classical guitars comprising in combination:

a guitar selected from a class of guitars including electric, acoustic and classical guitars and having means for generating analog type musical sounds that are created by a user of said guitar; and digital recording and playback means located on and part of said guitar and electronically connected directly to said means for generating analog type musical sounds for converting said analog type musical sounds of said guitar to digital type musical sounds of said guitar to produce long lasting, high quality, noise-free digitally recorded musical sounds of only said guitar and for playback of the digitally recorded musical sounds of only said guitar.

2. The apparatus of claim 1 wherein said guitar is an electric guitar.

3. The apparatus of claim 1 wherein said guitar is an acoustic guitar.

4. The apparatus of claim 1 wherein said guitar is a classical guitar.

5. The apparatus of claim 2 wherein said digital recording and playback means located on said guitar is a mini-disc unit having at least record and playback capabilities.

6. The apparatus of claim 3 wherein said digital recorded and playback means located on said guitar is a mini-disc unit having at least record and playback capabilities.

7. The apparatus of claim 4 wherein said digital recorded and playback means located on said guitar is a mini-disc unit having at least record and playback capabilities.

8. The apparatus of claim 5 wherein said guitar has an exterior housing, said mini-disc unit is located within a portion of said exterior housing and forms part of said exterior housing of said guitar.

9. The apparatus of claim 6 wherein said guitar has an exterior housing, said mini-disc unit is located within a portion of said exterior housing and forms part of said exterior housing of said guitar.

10. The apparatus of claim 7 wherein said guitar has an exterior housing, said mini-disc unit is located within a portion of said exterior housing and forms part of said exterior housing of said guitar.

11. A method for recording long lasting, high quality, noise-free musical sounds generated by a hand-held, portable musical instrument selected from a class of guitars including electric, acoustic and classical guitars comprising the steps of:

providing a guitar selected from a class of guitars including electric, acoustic and classical guitars and having means for generating analog type musical sounds that are created by a user of said guitar; and incorporating digital recording and playback means located on and part of said guitar and electronically connected directly to said means for generating analog type musical sounds for converting said analog type musical sounds of said guitar to digital type musical sounds of said guitar to produce long lasting, high quality, noise-free digitally recorded musical sounds of only said guitar and for playback of the digitally recorded musical sounds of only said guitar.

12. The method of claim 11 wherein said guitar is an electric guitar.

13. The method of claim 11 wherein said guitar is an acoustic guitar.

14. The method of claim 11 wherein said guitar is a classical guitar.

15. The method of claim 12 wherein said digital recording and playback means located on said guitar is a mini-disc unit having at least record and playback capabilities.

16. The method of claim 13 wherein said digital recording and playback means located on said guitar is a mini-disc unit having at least record and playback capabilities.

17. The method of claim 14 wherein said digital recording and playback means located on said guitar is a mini-disc unit having at least record and playback capabilities.

18. The method of claim 15 wherein said guitar has an exterior housing, said mini-disc unit is located within a portion of said exterior housing and forms part of said exterior housing of said guitar.

19. The method of claim 16 wherein said guitar has an exterior housing, said mini-disc unit is located within a portion of said exterior housing and forms part of said exterior housing of said guitar.

20. The method of claim 17 wherein said guitar has an exterior housing, said mini-disc unit is located within a portion of said exterior housing and forms part of said exterior housing of said guitar.

* * * * *

UNITED STATES PATENT AND TRADEMARK OFFICE
CERTIFICATE OF CORRECTION

PATENT NO : 5,837,912
DATED : 11-17-98
INVENTOR(S): EAGAN

It is certified that error appears in the above-identified patent and that said Letters Patent is hereby corrected as shown below:

On the title page:

Item [76]    change Eagen to Eagan

Inventor:  Change Eagen to Eagan

Signed and Sealed this

Second Day of March, 1999

*Attest:*

Q. TODD DICKINSON

*Attesting Officer*    *Acting Commissioner of Patents and Trademarks*